United States Patent [19]

Dohse

[11] Patent Number: 4,953,294

[45] Date of Patent: Sep. 4, 1990

[54] PORTABLE HANDHELD TOOL HAVING A DRIVE SHAFT ROTATABLY JOURNALLED IN A PROTECTIVE TUBE

[75] Inventor: Hans-Peter Dohse, Kernen-Rommelshausen, Fed. Rep. of Germany

[73] Assignee: Andreas Stihl, Waiblingen, Fed. Rep. of Germany

[21] Appl. No.: 438,056

[22] Filed: Nov. 20, 1989

[30] Foreign Application Priority Data

Nov. 24, 1988 [DE] Fed. Rep. of Germany ....... 3839548

[51] Int. Cl.$^5$ ..................... B26B 7/00; A01D 34/68
[52] U.S. Cl. .................................. 30/276; 030/296.1
[58] Field of Search .................. 173/163; 464/52, 173; 30/276, 296.1, 347

[56] References Cited

U.S. PATENT DOCUMENTS

| | | | |
|---|---|---|---|
| 3,581,523 | 6/1971 | Bartholomew | 464/52 |
| 3,610,056 | 3/1970 | Bartholomew | 464/52 |
| 3,977,078 | 8/1976 | Pittinger Jr. | 30/276 |
| 4,112,708 | 9/1978 | Fukuda | 464/52 |
| 4,226,021 | 10/1980 | Hoff | 30/276 |
| 4,424,045 | 1/1984 | Kolischenko et al. | 464/52 |
| 4,848,846 | 7/1989 | Yamada et al. | 30/276 |

Primary Examiner—Frank T. Yost
Assistant Examiner—John M. Husar
Attorney, Agent, or Firm—Walter Ottesen

[57] ABSTRACT

The invention is directed to a portable handheld tool such as a brushcutter which includes a work tool assembly and a drive motor connected by a drive shaft. The drive shaft is surrounded by a protective tube and is centrally held therein by means of a bearing sleeve unit. The bearing sleeve unit braces itself against the inner peripheral wall surface of the protective tube via outwardly extending supporting ribs. The mounting of the bearing sleeve unit within the protective tube must be adapted precisely with respect to tolerances in order to prevent damaging deformations of the bearing sleeve unit and to prevent the bearing sleeve unit from vibrating within the protective tube. At least one of the supporting ribs is configured so as to be resilient in the radial direction so that it effects a tolerance compensation as well as attenuates vibration.

8 Claims, 2 Drawing Sheets

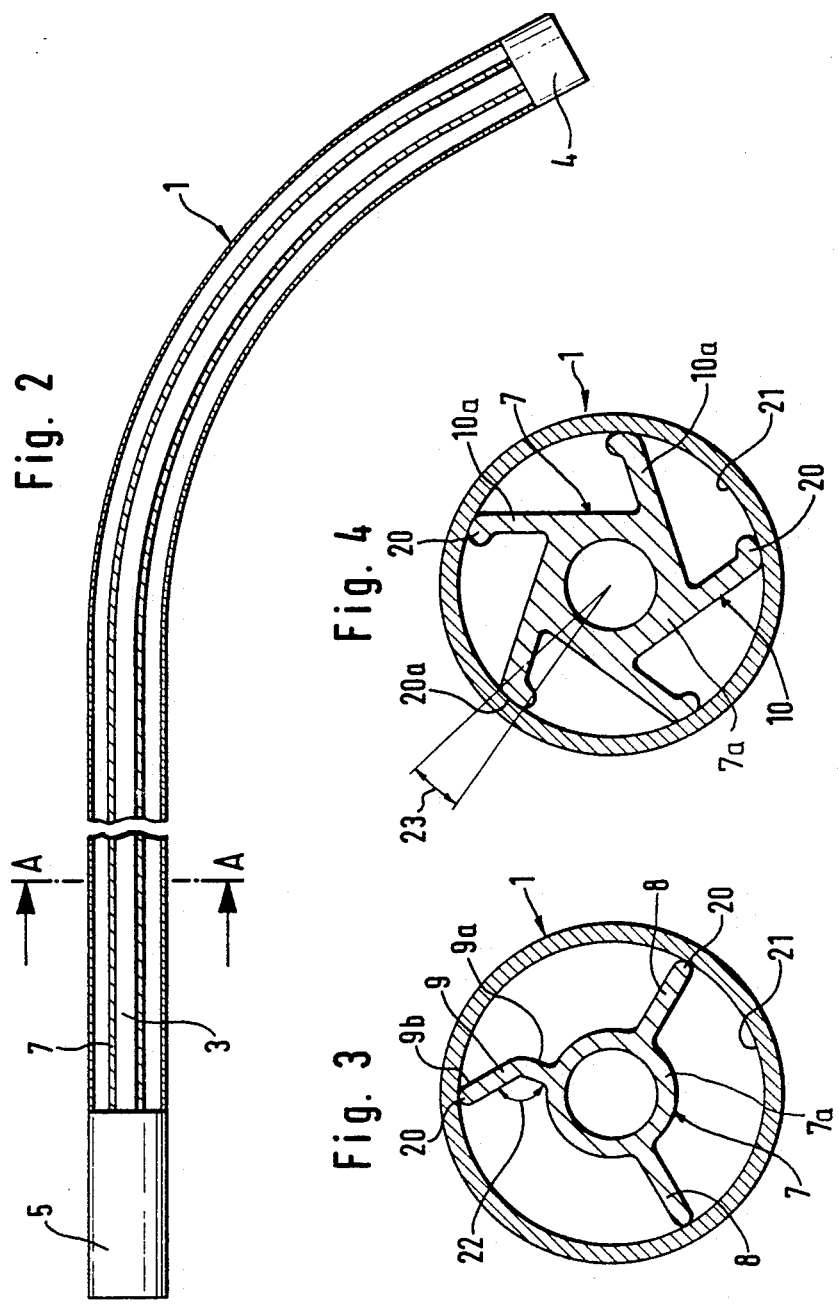

PORTABLE HANDHELD TOOL HAVING A DRIVE SHAFT ROTATABLY JOURNALLED IN A PROTECTIVE TUBE

FIELD OF THE INVENTION

The invention relates to a portable handheld tool such as a brushcutter. The portable handheld tool includes a protective tube having first and second ends. A motor is mounted on the first end and a work tool such as a cutterhead is mounted on the second end. The work tool is connected to the motor by a drive shaft which is journalled within the protective tube by at least one bearing sleeve unit.

BACKGROUND OF THE INVENTION

Brushcutters of the kind described above are known and are equipped with either a curved protective tube or with a straight protective tube. The protective tube supports a cutterhead at one end and a drive motor at the other end. The drive shaft connecting the motor with the cutterhead is supported within the protective tube by at least one bearing sleeve unit. For this purpose, the bearing sleeve unit includes radial supporting ribs which extend in the longitudinal direction of the protective tube.

No tolerance differences should occur when the bearing sleeve unit is built into the protective tube. If the bearing sleeve unit is undersize, then the supporting ribs are not in radial contact engagement with the protective tube so that the bearing sleeve unit defines a clearance space with the protective tube and can be subjected to radial oscillations therein. On the other hand, if the bearing sleeve unit is oversize, then forces develop which are applied to the supporting ribs and these forces are directed radially inwardly when the bearing sleeve unit is built into the protective tube. These forces can deform the bearing sleeve unit and severely limit its journalling characteristic.

However, disadvantages occur even when a bearing sleeve unit is seated in the protective tube with a precise fit. Oscillations and vibrations produced by the drive shaft are transmitted directly to the protective tube because of the considerable radial stiffness of the bearing sleeve unit. These oscillations and vibrations are disturbing to the operator. An amplified radial force is applied to the bearing sleeve unit because of the ovalization of the protective tube in the region thereof which is bent whereby the bearing sleeve unit becomes deformed.

SUMMARY OF THE INVENTION

The invention relates to a portable handheld work tool which includes a protective tube having a bearing sleeve unit for journalling the drive shaft which is so configured that a support of the drive shaft within the protective tube is obtained which attenuates vibration and compensates for tolerances.

The invention is for a portable handheld tool such as a brushcutter driven by a motor. The portable handheld tool includes: a housing for accommodating the motor therein; a protective tube having a rearward end connected to the housing and having a forward end, the tube also having an inner wall surface; a work tool assembly mounted on the forward end; a drive shaft mounted in the protective tube for connecting the motor to the work tool assembly; a bearing sleeve unit arranged in the protective tube and having a center portion for holding and guiding the drive shaft within the protective tube, the center portion having an outer surface adjacent the inner wall surface of the protective tube; the bearing sleeve unit further including a plurality of supporting ribs extending outwardly from the outer surface to brace against the bearing sleeve unit against the inner wall surface for supporting and centering the bearing sleeve unit within the protective tube; and, at least one of the ribs being configured so as to be resilient in a direction extending radially outwardly from the bearing sleeve unit to the inner wall surface.

A tolerance compensating support within the protective tube is achieved by means of at least one supporting rib which is configured so as to be resilient. This supporting rib effects an attenuation in the transmission of oscillations and vibrations while at the same time effecting the tolerance compensation. A more convenient assembly of the bearing sleeve unit into the protective tube is obtained by the tolerance compensation provided with greater tolerances being permitted during the manufacture of the protective tube as well as for the manufacture of the bearing sleeve unit. An oversize of the bearing sleeve unit is taken up by the resilient supporting rib without the bearing sleeve unit becoming deformed. The bearing and journalling characteristic of the bearing sleeve unit is maintained even during bending of the protective tube and the ovalization thereof associated therewith.

Pursuant to a preferred embodiment of the invention, the supporting ribs are provided with head portions which extend in the peripheral direction of the tube and have bearing surfaces shaped to correspond to a circular segment. In this way, a surface contact of the bearing sleeve unit on the inner wall surface of the protective tube is obtained whereby an improved transfer of heat is made possible. The heat developed in the bearing sleeve unit can in this way be conducted to the protective tube via the supporting ribs so that the danger of an overtemperature over the length of the bearing sleeve unit is reliably avoided. Even under the most disadvantageous conditions, the characteristic of the bearing sleeve unit as a bearing is unaffected.

BRIEF DESCRIPTION OF THE DRAWINGS

The invention will now be described with reference to the drawings wherein:

FIG. 2 is a side elevation expanded view, partially in section, of the protective tube of the brushcutter shown in FIG. 1;

FIG. 3 is an enlarged section view taken along line A—A of FIG. 2; and,

FIG. 4 is a section view showing another embodiment of a bearing sleeve unit mounted within a protective tube.

DESCRIPTION OF THE PREFERRED EMBODIMENTS OF THE INVENTION

Figure 1:
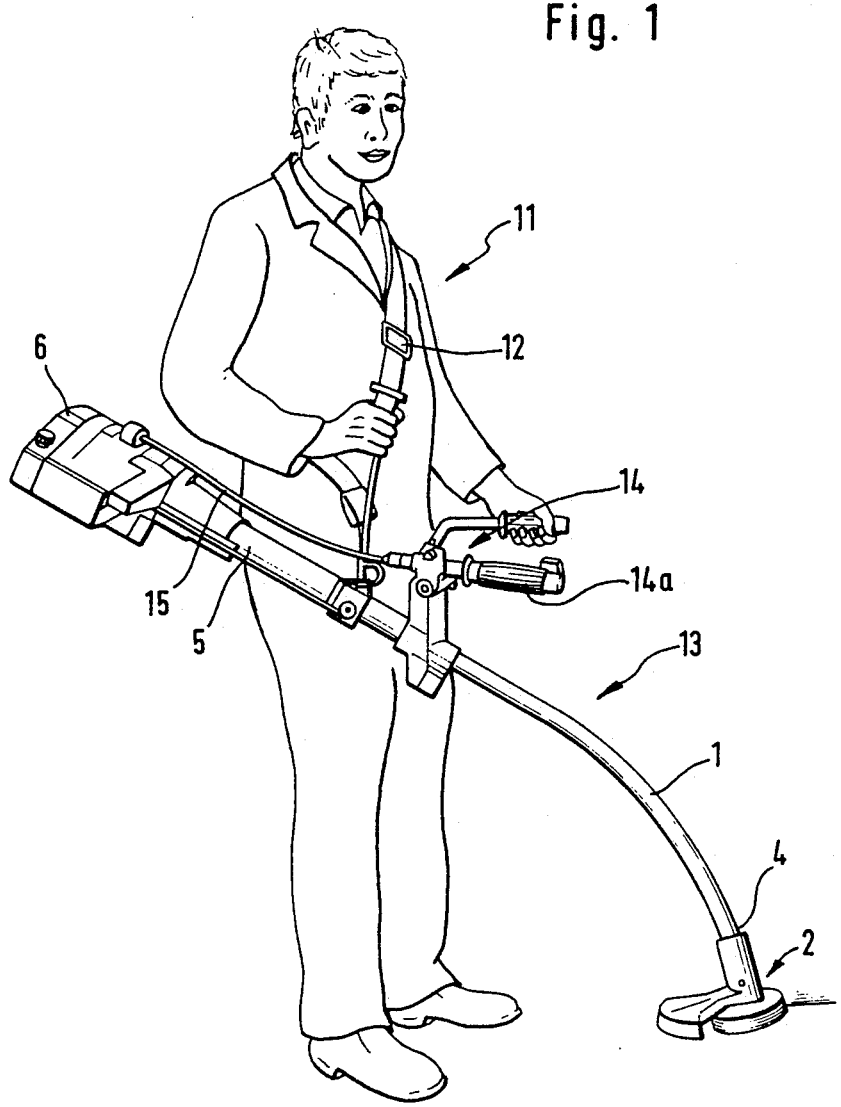
FIG. 1 is a perspective view of a brushcutter held in its operating position with the brushcutter being equipped with a bent protective tube.

The operator 11 shown in FIG. 1 wears a carrier belt 12 over the left shoulder on which the brushcutter 13 is supported. The brushcutter essentially comprises a protective tube 1 having a forward end 4 on which a rotating cutterhead 2 is mounted. The cutterhead 2 is driven by a motor 6 attached to the rearward end 5 of the protective tube 1. The carrier belt 12 supports the brushcutter 13 at approximately the center of gravity thereof. A handle bar 14 is attached to the protective tube 1 between the attachment of the carrier belt 12 and the cutterhead 2. The operator guides the brushcutter 13 with the handle bar 14. The motor 6 of the brushcutter is configured as a gasoline engine and the throttle control line 15 is operated at the right handle 14a by rotating the handle grip.

FIG. 2 is an axial section view taken through the protective tube 1. A connecting arrangement for the engine 6 is provided at the rearward end 5 and a connecting arrangement for the cutterhead 2 is provided at the forward end 4. A flexible drive shaft 3 is arranged within the bent protective tube 1 and is held in its central position within the protective tube 1 by means of a bearing sleeve unit 7. In the embodiment shown, the bearing sleeve unit extends over the entire length of the protective tube 1. However, it can be advantageous to provide several short bearing sleeve units spaced one from the other along the length of a drive shaft 3 especially when the latter is a flexible drive shaft.

The bearing sleeve unit shown in FIG. 3 includes supporting ribs (8, 9) which extend along the longitudinal length of the protective tube 1 and lie with their head portions 20 against the inner wall surface 21 of the protective tube 1. At least three supporting ribs are required for centering the bearing sleeve unit 7. At least one of these supporting ribs is configured so as to be resilient in the radial direction and this supporting rib is identified in FIG. 3 by reference numeral 9. The radially resilient supporting rib 9 includes a first segment 9a which extends radially outwardly from the bearing sleeve center portion 7a and a second segment 9b which extends from the first segment 9a in a direction along a tangent to the outer surface of the center portion 7a. The second segment 9b terminates in a head portion 20 lying against the inner wall surface of the protective tube 1. The first segment 9a and the second segment 9b conjointly define an angle 22 of approximately 130°.

The resilient supporting rib 9 compensates for tolerances during assembly of the bearing sleeve unit 7 so that the bearing sleeve unit 7 is substantially free of radial pressure forces and therefore does not change its form. The radially resilient supporting rib 9 thereby makes possible a simpler and tolerance-independent assembly of the bearing sleeve unit 7 in the protective tube 1. Furthermore, fewer oscillations and vibrations are transmitted to the protective tube 1 because of the resilient configuration of the supporting rib 9. Accordingly, fewer oscillations and vibrations are transmitted beyond the protective tube 1.

According to a preferred embodiment of the invention, all of the supporting ribs 10 extending in the longitudinal direction of the protective tube 1 are configured so as to be resilient. As shown in FIG. 4, preferably five ribs 10 are provided in this embodiment and they are uniformly distributed about the periphery of the bearing sleeve unit 7. All of these resiliently configured supporting ribs 10 have a head portion 20 by means of which they are in contact engagement with the inner wall surface of the protective tube 1. The head portions 20 advantageously extend from the linearly extending supporting rib segment 10a into the peripheral direction of the protective tube 1 and have a contact engagement surface 20a which is shaped to approximate a circular segment. In the embodiment shown in FIG. 4, this circular segment extends over a peripheral angle 23 of approximately 10° to 15°. The supporting ribs 10 thereby extend precisely tangentially from the bearing center portion 7a and extend in a straight line toward the inner wall surface 21 of the protective tube 1. The larger contact engagement surface 20a of the head portion 20 on the inner wall surface 21 of the protective tube 1 makes possible an improved heat transfer and thereby facilitates a better conduction of the heat developed in the bearing to the protective tube so that the lubricant in the bearing sleeve unit 7 will not become endangered by overtemperature.

The bearing sleeve unit according to the invention is especially advantageous for use in bent protective tubes 1 and avoids imparting an oval configuration to the bearing sleeve center portion when the protective tube is bent. The invention affords the advantages of tolerance compensation, good heat transfer, and an avoidance of a transmission of oscillations and vibrations to the protective tube and these advantages are also provided in protective tubes which are of linear configuration.

It is understood that the foregoing description is that of the preferred embodiments of the invention and that various changes and modifications may be made thereto without departing from the spirit and scope of the invention as defined in the appended claims.

What is claimed is:

1. A portable handheld tool such as a brushcutter driven by a motor, the portable handheld tool comprising:

a housing for accommodating the motor therein;

a protective tube which can be subjected to vibrations during operational use of the tool, the protective tube having a rearward end connected to said housing and having a forward end, said tube also having an inner wall surface;

a work tool assembly mounted on said forward end;

a drive shaft mounted in said protective tube for connecting said motor to said work tool assembly;

a bearing sleeve unit arranged in said protective tube and which can be subjected to radial pressure forces when mounted in said tube;

said bearing sleeve unit including an annular-like center portion defining a bearing opening for holding and guiding said drive shaft within said protective tube, said center portion having an outer surface in spaced relationship to said inner wall surface of said protective tube;

said bearing sleeve unit further including a plurality of supporting ribs extending outwardly from said outer surface to brace said bearing sleeve unit against said inner wall surface for supporting and centering said bearing sleeve unit within said protective tube; and, at least one of said ribs being configured to extend approximately tangentially to said annular-like center portion so as to be resilient in a direction extending radially outwardly from said annular-like center portion thereby substantially isolating said annular-like center portion from said pressure forces and said protective tube from said vibrations.

2. The portable handheld tool of claim 2, said one rib extending linearly.

3. The portable handheld tool of claim 1, said one rib including first and second segments extending one behind the other from said outer surface to said inner wall surface, said first segment extending radially outwardly from said outer surface and said second segment extending away from said first segment in a direction tangent to said outer surface.

4. The portable handheld tool of claim 1, said one rib having an outer head portion defining an arcuate contact engagement surface for supporting said rib against said inner wall surface; and, said arcuate contact engagement surface being approximately circular in configuration.

5. The portable handheld tool of claim 1, all of said ribs being configured so as to be resilient in respective directions extending radially outwardly from said outer surface of said center portion to said inner wall surface.

6. The portable handheld tool of claim 1, said ribs being distributed uniformly over said outer surface of said center portion.

7. The portable handheld tool of claim 1, said drive shaft having a predetermined length between said motor and said work tool assembly; and, said bearing sleeve unit extending along all of said length of said drive shaft.

8. The portable handheld tool of claim 1, the remaining ones of said ribs extending radially from said outer surface of said annular-like center portion to said inner wall surface of said protective tube.

* * * * *

UNITED STATES PATENT AND TRADEMARK OFFICE
CERTIFICATE OF CORRECTION

PATENT NO. : 4,953,294

DATED : September 4, 1990

INVENTOR(S) : Hans-Peter Dohse

It is certified that error appears in the above-identified patent and that said Letters Patent is hereby corrected as shown below:

In column 4, line 62: delete "claim 2," and substitute -- claim 1, -- therefor.

Signed and Sealed this

Seventh Day of April, 1992

*Attest:*

HARRY F. MANBECK, JR.

*Attesting Officer*     *Commissioner of Patents and Trademarks*